W. Somerville,

Horse Boot.

No. 104,369. Patented June 14, 1870.

Witnesses: Inventor:

United States Patent Office.

WILLIAM SOMERVILLE, OF BUFFALO, NEW YORK.

Letters Patent No. 104,369, dated June 14, 1870.

IMPROVEMENT IN INTERFERING-PAD FOR HORSES.

The Schedule referred to in these Letters Patent and making part of the same

*To all whom it may concern:*

Be it known that I, WILLIAM SOMERVILLE, of Buffalo, in the county of Erie and State of New York, have invented a new and useful Improvement in Interfering-Pads for Horses; and I do hereby declare that the following is a full, clear, and exact description of the same, reference being had to the accompanying drawing forming part of this specification, in which—

Figure 2 is a view of the shoe, showing the lugs for receiving the catches of the pad, while

Like letters of reference indicate corresponding parts.

Figure 1:
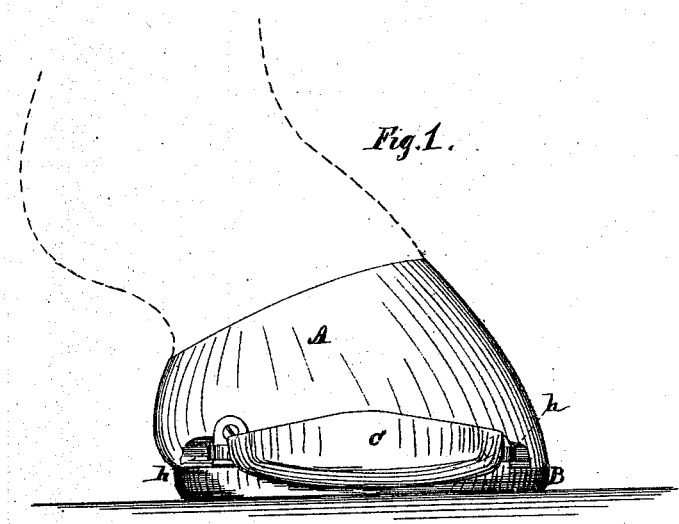
Figure 1 is a side view of my improved interfering-pad as attached to the hoof of a horse.
Figure 2:
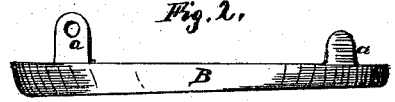
Figure 3:
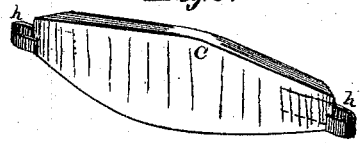
Figure 3 is a detached view of the interfering-pad with its hooks or catches.

This invention relates to that class of devices known as interfering-pads or guards, and is designed to prevent the shoes or the hoofs of horses from striking and injuring the opposite leg or ankle, while walking or trotting; and It consists in a novel and peculiarly-constructed pad, guard, or cushion, provided with catches or hooks, so as to engage with lugs or clips formed with the shoe or plates attached to the hoof, all of which will hereinafter be described.

A in the drawing represents the hoof of a horse.

B, the shoe, with its lugs, clips, or plates, while

C is the elastic pad, guard, or cushion.

The shoe B is of the ordinary construction, with the exception that its top part, on the inner side, is formed or provided with lugs, clips, or plates, *a a*, a cavity being formed in the hoof under the lugs, clips, or plates, so as to allow of the ready attachment of the hooks *h h*, hereinafter mentioned.

The lugs, clips, or plates *a a* may either be formed with the shoe B, or may be attached to the hoof by rivets, bolts, or cement, as shown in fig. 1.

C is the interfering-pad, guard, or cushion, constructed of gutta-percha, vulcanized rubber, or other suitable elastic or soft material, of a length sufficient to encircle about one side, more or less, of the hoof on the inside.

*h h* are catches or hooks secured to the pad, guard, or cushion, by cement, bolts, or rivets, so as to engage with the lugs, clips, or plates *a a*, and firmly secure the pad in its proper position on the inside of the hoof, or the catches *h h* may be imbedded within the cushion at or near each end, in such a manner as to allow the center of the pad or cushion to be easily elongated or stretched.

The length of the pad, together with the catches, is somewhat less than the distance between the lugs, clips, or plates on the shoe or hoof, so that, when the elastic substance is stretched, and the catches forced into their respective openings, around, and connect or interlock with the lugs or plates *h h*, the tension of the material firmly retains the pad upon the hoof.

Instead of using an ordinary strap of rubber or other material in connection with the fastening devices, as shown, it is especially designed to cast the pad in suitable molds, and secure the catches or hooks to the same during the process of construction.

This mode of attaching the catches or hooks can as readily be applied to cylindrical as flat pads.

It will thus be seen that I have produced a substantial and effective attachment, readily applied to the hoofs of horses, and retained in its position on the hoof, owing to the tension of the elastic material. Straps and buckles connected to pads render them almost useless, as they have not only to be constantly repaired and refurnished, but greatly injure the muscles, skin, and hair, whenever used upon the legs or hoofs of animals.

Having thus described my invention,

What I claim as new, and desire to secure by Letters Patent, is—

1. The interfering-pad or cushion C, with its catches or hooks *h h*, combined with the lugs or plates *a a*, substantially as herein shown and described.

2. The catches or hooks *h h*, imbedded within the pad or cushion during the process of construction, substantially as herein shown and described.

To the above specification I have signed my name this 26th day of April, 1870.

WM. SOMERVILLE.

Witnesses:
THOS. BATH,
EDWARD R. RACON.